(12) United States Patent
Muszinski et al.

(10) Patent No.: US 12,017,864 B2
(45) Date of Patent: Jun. 25, 2024

(54) DEVICE AND METHOD FOR TRANSPORTING CONTAINERS

(71) Applicant: KHS GmbH, Dortmund (DE)

(72) Inventors: Olaf Muszinski, Kelkheim (DE); Andreas Fahldieck, Idar-Oberstein (DE); Thomas Stolte, Bad Kreuznach (DE); Dominik Weirich, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 269 days.

(21) Appl. No.: 17/621,297

(22) PCT Filed: Jun. 23, 2020

(86) PCT No.: PCT/EP2020/067409
§ 371 (c)(1),
(2) Date: Dec. 21, 2021

(87) PCT Pub. No.: WO2020/260227
PCT Pub. Date: Dec. 30, 2020

(65) Prior Publication Data
US 2022/0356020 A1 Nov. 10, 2022

(30) Foreign Application Priority Data

Jun. 27, 2019 (DE) .......................... 102019117377.9

(51) Int. Cl.
*B65G 43/08* (2006.01)
*B65G 21/20* (2006.01)
*B67C 7/00* (2006.01)

(52) U.S. Cl.
CPC ......... *B65G 43/08* (2013.01); *B65G 21/2072* (2013.01); *B67C 7/0046* (2013.01);
(Continued)

(58) Field of Classification Search
CPC ................ B65G 43/08; B65G 21/2072; B65G 2201/0235; B65G 2203/0208;
(Continued)

(56) References Cited

U.S. PATENT DOCUMENTS 8,186,503 B1 5/2012 Burchell et al.
9,187,262 B2 * 11/2015 Fahldieck ............ B65G 47/846
(Continued)

FOREIGN PATENT DOCUMENTS

DE 102011010955 A1 * 8/2012 .......... B65G 47/846
DE 102011010955 A1 8/2012
(Continued)

OTHER PUBLICATIONS

International Search Report and Written Opinion, PCT Application No. PCT/EP2020/067409, mailed Sep. 14, 2020 (14 pages).

*Primary Examiner* — Gene O Crawford
*Assistant Examiner* — Abby A Jorgensen
(74) *Attorney, Agent, or Firm* — Occhiuti & Rohlicek LLP

(57) ABSTRACT

A transport system for transporting containers along a transport path in a transport direction includes first and second transporters that define first and second transport-path sections, at least one of which follows a circular arc. A third transport-path section between the first and second transport-path sections comprises an adjustable transition curve.

20 Claims, 6 Drawing Sheets

(52) U.S. Cl.
CPC ............... *B65G 2201/0235* (2013.01); *B65G 2203/0208* (2013.01)

(58) Field of Classification Search
CPC ...... B65G 47/846; B65G 35/00; B65G 43/00; B65G 2203/02; B65G 2203/042; B67C 7/0046
See application file for complete search history.

(56) References Cited

U.S. PATENT DOCUMENTS

| | | | |
|---|---|---|---|
| 9,969,567 B2 * | 5/2018 | Kurosawa | ................. B67C 3/24 |
| 10,035,294 B2 * | 7/2018 | Frankenberger | ........ B29C 49/46 |
| 10,987,719 B2 * | 4/2021 | Kurosawa | .......... B21D 51/2661 |
| 2006/0287817 A1 * | 12/2006 | Nagel | ................... B60W 50/14 |
| | | | 701/507 |
| 2017/0306568 A1 * | 10/2017 | Lichtberger | .......... G06T 15/205 |
| 2018/0290837 A1 * | 10/2018 | Slurink | ................ B65G 47/846 |
| 2019/0100382 A1 * | 4/2019 | Skotschek | ............... B66C 13/48 |

FOREIGN PATENT DOCUMENTS

| | | | | |
|---|---|---|---|---|
| DE | 102017112220 A1 | | 12/2018 | |
| EP | 2179960 A1 | | 4/2010 | |
| EP | 2987764 A1 | * | 2/2016 | ........... B29C 49/421 |
| EP | 2987764 A1 | | 2/2016 | |
| JP | H054712 A | | 1/1993 | |
| JP | 05213441 A | * | 8/1993 | |
| JP | H05213441 A | | 8/1993 | |
| JP | 2000211722 A | * | 8/2000 | |
| JP | 2000211722 A | | 8/2000 | |
| JP | 2001287794 A | * | 10/2001 | ........... B65G 47/846 |
| WO | WO-2005123553 A1 | * | 12/2005 | ......... B65G 21/2072 |
| WO | WO-2017097453 A1 | * | 6/2017 | ......... B65G 21/2072 |
| WO | WO-2018219523 A1 | * | 12/2018 | ............. B65G 47/52 |

* cited by examiner

DEVICE AND METHOD FOR TRANSPORTING CONTAINERS

RELATED APPLICATIONS

This is the national stage of international application PCT/EP2020/067409, filed on Jun. 23, 2020, which claims the benefit of the Jun. 27, 2019 filing date of German application 102019117377.9, the contents of which are incorporated herein by reference.

FIELD OF INVENTION

The invention relates to transporting containers and in particular to transporting containers along a transition region between two transporters that are adjacent in the transport direction.

BACKGROUND

In container-processing systems, it is known to transfer a container from one transporter to another. This sometimes results in an acceleration that affects the level of liquid contents in the container. If the container happens to still be open, some of the liquid may spill out.

One solution for addressing this difficulty is to reduce container speed, thus reducing acceleration and the forces that result therefrom. However, reducing container speed reduces production capacity. This is generally undesirable.

SUMMARY

An object of the invention is that of providing an apparatus and a method for the transporting of containers in a way that reduces transverse jerk.

According to a first aspect, the invention relates to a transport system for transporting containers on a transport path in a transport direction. The transport system comprises first and second transporters that are connected to one another over a transport-path section along a transport path having first and second transport-path sections, one of which follows an arc of a circle. Provided between the first and second transport-path sections along the transport path is a third transport-path section.

According to the invention, the third transport-path section comprises at least one transition-curve section with an adjustable curve path. In other words, provision is made for the third transport-path section to be configured as adjustable, i.e., changeable, at least in one transition-curve section, in relation to the unchanging first and second transport-path sections.

The relative degree of adjustment of the third transport-path section along at least one transition-curve section in relation to the adjacent connecting first and/or second transport-path section respectively allows for a high degree of flexibility in the adjustment of the movement path to the most widely differing filling materials with different mechanical properties, such as toughness, adhesion behavior, internal damping effect of the fluid, and also an adjustment to the capacity (filled containers per hour) of the container handling machine, and also to the shape of the containers, with the aim of a movement path optimized in respect of product loss.

The transport path and its transport-path sections are inherently two-dimensional. However, for purposes of description, they are defined by the one-dimensional movement path of the mid-point of a container being moved along the mid-line of a transport path.

As a supplement to this, hereinafter the term "transport path" or "transport-path section", with the respective transition-curve sections, also referred to heretofore, should be understood to mean a corridor in which the mid-line referred to above can deviate from its optimum course. The corridor's width can be delimited by boundary curves. Embodiments include those in which the distance between the boundary curves and the mid-line amounts to between two and twenty millimeters perpendicular to each side of the mid-line. The total width of the corridor consequently amounts to between four and forty millimeters, preferably between four and twenty millimeters, and for particular preference between two and ten millimeters. A more precise approximation to the optimum course allows for a more uniform conveying of the containers.

An advantage of the transport system arises from an adjustable transport-path section's ability to avoid an abrupt change in the transverse acceleration taking effect on the containers. This reduces risk of spilling filling material from a still open container.

In some embodiments, the transition curve's curvature is adjustable by an adjuster, either manually or by a motor, in a controlled and/or regulated manner. A manual adjustment can be carried out, for example, by a hand crank associated with the adjuster.

In some embodiments, a section of the curved path, and therefore a length and/or at least one radius and/or at least one mid-point of the associated radius, is configured such as to have an adjustable position along a transition-curve section, by the adjuster.

In some embodiments, guide rails guide containers along one or more of the transport-path sections. When moved by an adjuster, the guide rails adjust the curvature of the transition curve.

Embodiments include those in which several adjusters are assigned to a transition-curve section and are disposed separated from each other along that transition-curve section.

Some embodiments include a sensor that is electrically connected by an electronic controller to the corresponding adjuster. The sensor detects, in a preferably fixed location detection region, an actual spillage height of the respective container. The controller compares a signal indicative of this height with a reference spillage height stored in the controller. The controller then generates a signal from a possible deviation and actuates the adjusters to carry out the adjustment necessary to control deviation between the actual spillage height and the reference spillage height. It does so by causing the adjuster to adjust at least one length and/or of at least one radius and/or of at least one mid-point of the associated radius in an X and/or Y-direction of the curvature of the curve path of the at least one transition-curve section.

In this situation, by the controller, the signal generated as a dependency of the deviation between the actual spillage height and the reference spillage height can also be used in order to change the capacity (containers transported per time unit) of the transport system for transporting the containers, i.e., to increase and/or reduce it. In other words, a capacity control and/or regulation therefore takes place as a dependency of the actual spillage height detected by the sensor.

Particularly advantageously, the actual spillage height can be detected in all regions along the transport path of the containers at which a spillage or overspill can occur. For this purpose provision can be made for the arrangement of one or also more sensors detecting the actual spillage height.

By way of this procedure it is possible, by the monitoring of all the critical spillage locations, for the total capacity of the transport system for transporting containers to be driven as closely as possible to its performance maximum (containers transported per time unit).

In this situation, a distinction is essentially to be made between the following cases:

By way of example, the transport system for transporting containers can initially be started with a transport capacity which is set as lower than its possible maximum capacity (containers transported per time unit), and thereby the actual spillage height can be detected by the at least one sensor. In this situation, it is then possible, as a dependency of the signal generated from the deviation between the actual spillage height and the reference spillage height, for the capacity (containers transported per time unit) of the transport system to be changed, in particular increased, for as long as until the actual spillage height corresponds to the reference spillage height. Following this, an adjustment can then be made to the curvature of the curve path of the at least transition-curve section, by the at least one adjuster in the manner described in greater detail heretofore. Preferably, these two steps are carried out repeatedly in an iteration process, and, after each run through of an iteration loop, the capacity of the transport system can be increased, such that the maximum capacity of the transport system (containers transported per time unit) can be approached as closely as possible).

As an alternative, provision can also be made that initially a start can be made with a capacity of the transport system for the transporting of containers which is adjusted as lower than its possible maximum capacity (containers transported per time unit), and thereby the actual spillage height is detected by the at least one sensor. In this situation, first an adjustment of the curvature of the curve path of the at least one transition-curve section is carried out by the at least one adjuster in the manner described in greater detail heretofore, and, following this, it is then possible, depending on the signal generated by the deviation between the actual spillage height and the reference spillage height, for the capacity (containers transported per time unit) of the transport system for transporting containers to be changed, in particular increased, for as long as until the actual spillage height corresponds to the reference spillage height. Preferably, these two steps are also carried out repeatedly in an iteration process, and after each run through of an iteration loop, the capacity of the transport system is increased, such that the maximum capacity of the transport system (containers transported per time unit) is approximated as closely as possible.

In some embodiments, the third transport-path section comprises a first and second transition-curve section, which in each case comprise a separate curve path, which are adjustable separately from one another.

In some embodiments, a first length and/or a first radius and/or a first mid-point of the associated first radius are configured so as to be adjustable by a motor in an X or Y direction of the curvature of the curve portion of the first transition-curve section, by at least one first adjuster. A second length and/or a second radius and/or a second mid-point of the associated second radius can also be configured as motor-adjustable in an X and/or Y direction of the curvature of the curve path of the second transition-curve section, by at least one second adjuster.

In some embodiments, the third transport-path section comprises a first, a second, and a third transition-curve section, each of which comprises a separate and individually adjustable curve path.

In some embodiments, a third length and/or a third radius and/or a third mid-point of the associated third radius are configured so as to be motor-adjustable in an X and/or Y direction of the curvature of the curve path of the third transition-curve section, by at least one third adjuster.

According to one exemplary embodiment, the transition-curve section is a clothoid section and is described by the following formulas:

$$A = \sqrt{2 \cdot TW \cdot R^2};$$

$$KL = \frac{A^2}{R};$$

where "A" is a clothoid parameter, TW is the tangent angle, R the clothoid radius, and KL the clothoid length.

In some embodiments, the clothoid parameter "A" is selected in the range between 125 millimeters and 250 millimeters, in particular in the range between 150 millimeters and 200 millimeters, for particular preference in the range between 170 millimeters and 180 millimeters. As a result, it is possible, with conventional transporter diameters, for example in the range between 1 m and 5 m, for a transfer of the containers to be achieved which is free of transverse jerk or at least with a reduced transverse jerk.

In some embodiments, the tangent angle TW is selected in the range between 0.06 rad and 0.5 rad, in particular in the range between 0.1 rad and 0.4 rad, and for particular preference as 0.2 rad. As a result, it is possible, by a spatially delimited lifting stroke movement and a delimited axial distance interval of the transporters from one another, for a transfer of the containers to be achieved which is free of transverse jerk or at least with a reduced transverse jerk.

In some embodiments, the clothoid length KL lies in the range between 50 millimeters and 250 millimeters, and in particular in the range between 100 millimeters and 200 millimeters. This too leads to a transfer of the containers to be achieved which is free of transverse jerk or at least with a reduced transverse jerk between the transporters without any excessive geometrical changes to the transport path or the transport system.

In some embodiments, the transition-curve section is configured as a Bloss curve, with which the course of the curvature is defined by a cubic polynomial, which merges tangentially from one curvature into the other. The transfer curve portion, referred to hereinafter also as the "transition curve," has a transfer bend start (ÜA) and a transfer bend end (ÜE). The curvature k between the transfer bend start with the curvature zero and the transfer bend end with the curvature of the following connected radius of a connection circular partial circle is defined as follows:

$$k = \frac{3}{R \cdot L^2} \cdot l^2 - \frac{2}{R \cdot L^3} \cdot l^3$$

where R is the radius of the connection partial circle, l is the intermediate length of the transition bend portion, seen from ÜA, and L is the overall length of the transition bend.

If two transition-curve sections are connected to one another, directly or indirectly, it is possible with one alternative embodiment, for the one transition-curve section to be configured as different from the other, in that, for example, one Bloss curve/portion connects to a counter-direction Bloss curve, directly or after a straight section. It is also conceivable, in a third transport-path section, for combinations of a Bloss curve or Bloss curve portion and a clothoid portion to be arranged.

As used herein, "clothoid" refers to a curve having a curvature that linearly increases such that the product of curve radius and bend length of the curve form a constant. In other words, the curvature at each point on the curve is proportional to the length of its bend up to that point.

"Containers" in the meaning of the invention are understood to mean any types of container, in particular bottles, cans, beakers, etc., in each case of metal, glass, and/or plastic, preferably of PET (polyethylene terephthalate).

The expression "essentially" or "approximately" signifies in the meaning of the invention deviations from the exact value in each case by a maximum of ±10%, preferably by a maximum of ±5%, and/or deviations in the form of changes which are not of significance for the function.

Further embodiments, advantages, and possible applications of the invention also derive from the following description of exemplary embodiments and from the figures. In this situation, all the features described and/or represented in the images are in principle the object of the invention, alone or in any desired combination, regardless of their relationship in the claims or reference to them. The contents of the claims are also deemed to be a constituent part of the description.

BRIEF DESCRIPTION OF THE FIGURES

These and other features of the invention will be apparent from the following detailed description and the accompanying figures, in which.

DETAILED DESCRIPTION

Figure 1:
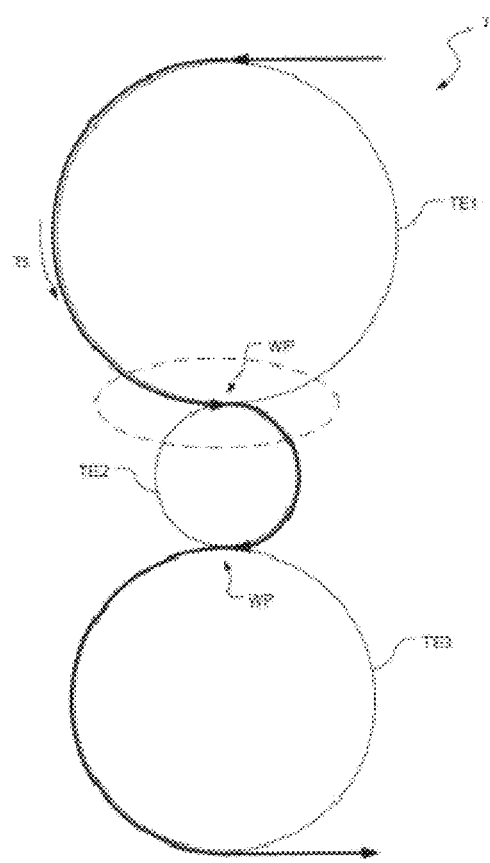
FIG. 1 shows a transport system having plural transporters.
Figure 6:
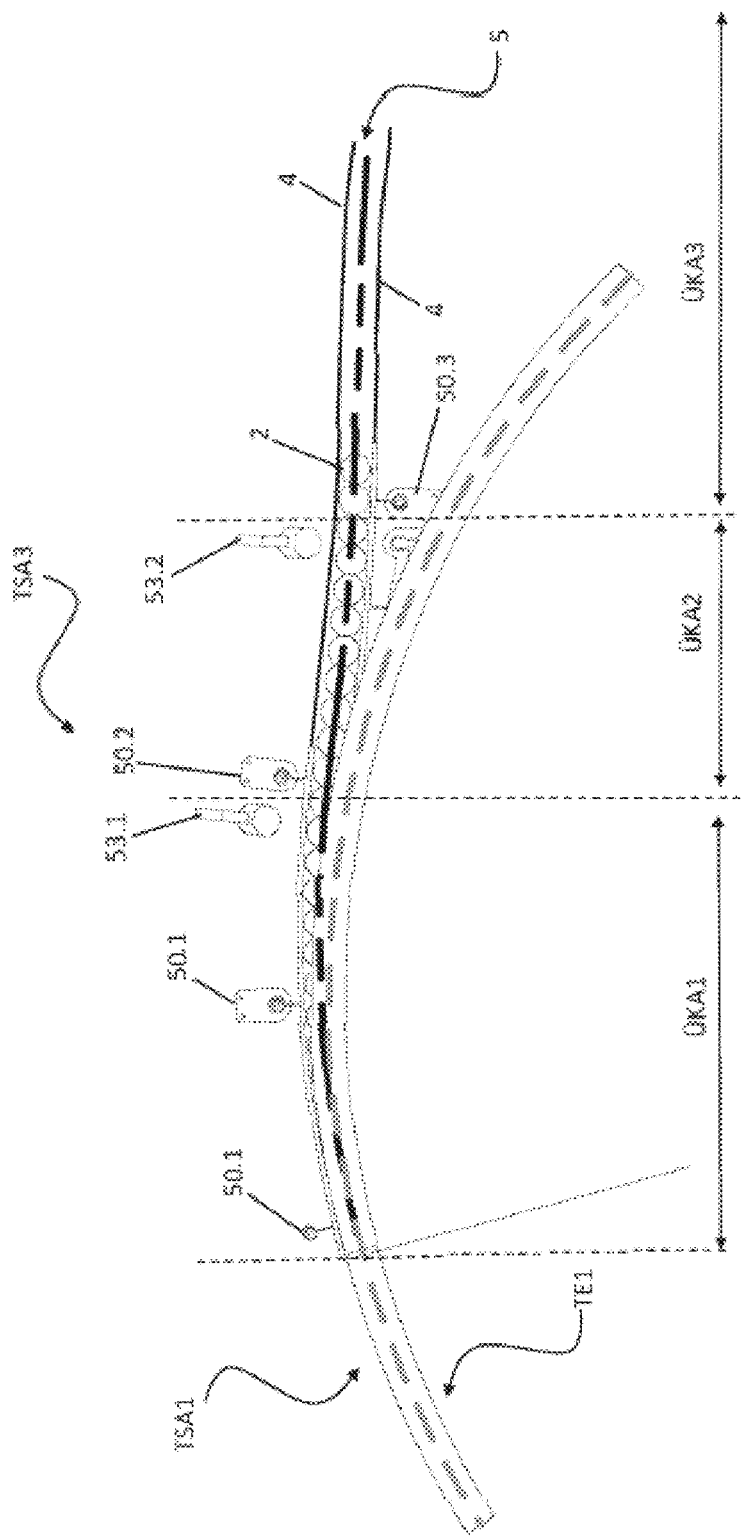
FIG. 6 shows a portion of the transport path lying in the transfer region between first and second transporters.

FIG. 1 shows a schematic view of a transport system 1 that transports containers 2 that are shown in FIG. 6. The transport system 1 transports the containers 2 in a transport direction along a curved transport path TS. As a container 2 travels along the transport path TS, it encounters turning points WP at which a deflection occurs. Such deflections represent points of inflection along the transport path TS at which the direction of the transport path's curvature changes. Stated in more mathematical terms, the cross product of the container's velocity vector and the vector that defines the curve's radius-of-curvature changes sign at a turning point WP.

The transport system 1 includes a first, second, and third transporters TE1, TE2, TE3. The second transporter TE2 is connected to both the first and third transporters TE1 and TE3. Each of the transporters TE1, TE2, TE3 rotates about a corresponding vertical machine axis. Along the circumference of each transporter TE1, TE2, TE3 are grippers or receivers for holding containers 2 during transport thereof.

In some embodiments, the transporters TE1, TE2, TE3 carry out some form of container treatment. Among these are embodiments in which the first transporter TE1 is a filling machine that fills containers with a filling product and the third transporter TE3 is a closing machine that closes containers. In such cases, the second transporter TE2 is a transfer star that carries open containers from the first transporter TE1 to the third transporter TE3. In other embodiments, the second transporter TE2 is a linear conveyor that transports containers along a straight line.

Between turning points WP, the transport path TS is essentially circular. However, at a turning point WP, the transport path's curve changes significantly. Thus, a container 2 traversing a turning point WP is vulnerable to a transverse jerk. This creates a risk of spillage if the container 2 happens to be open and filled.

Figure 2:
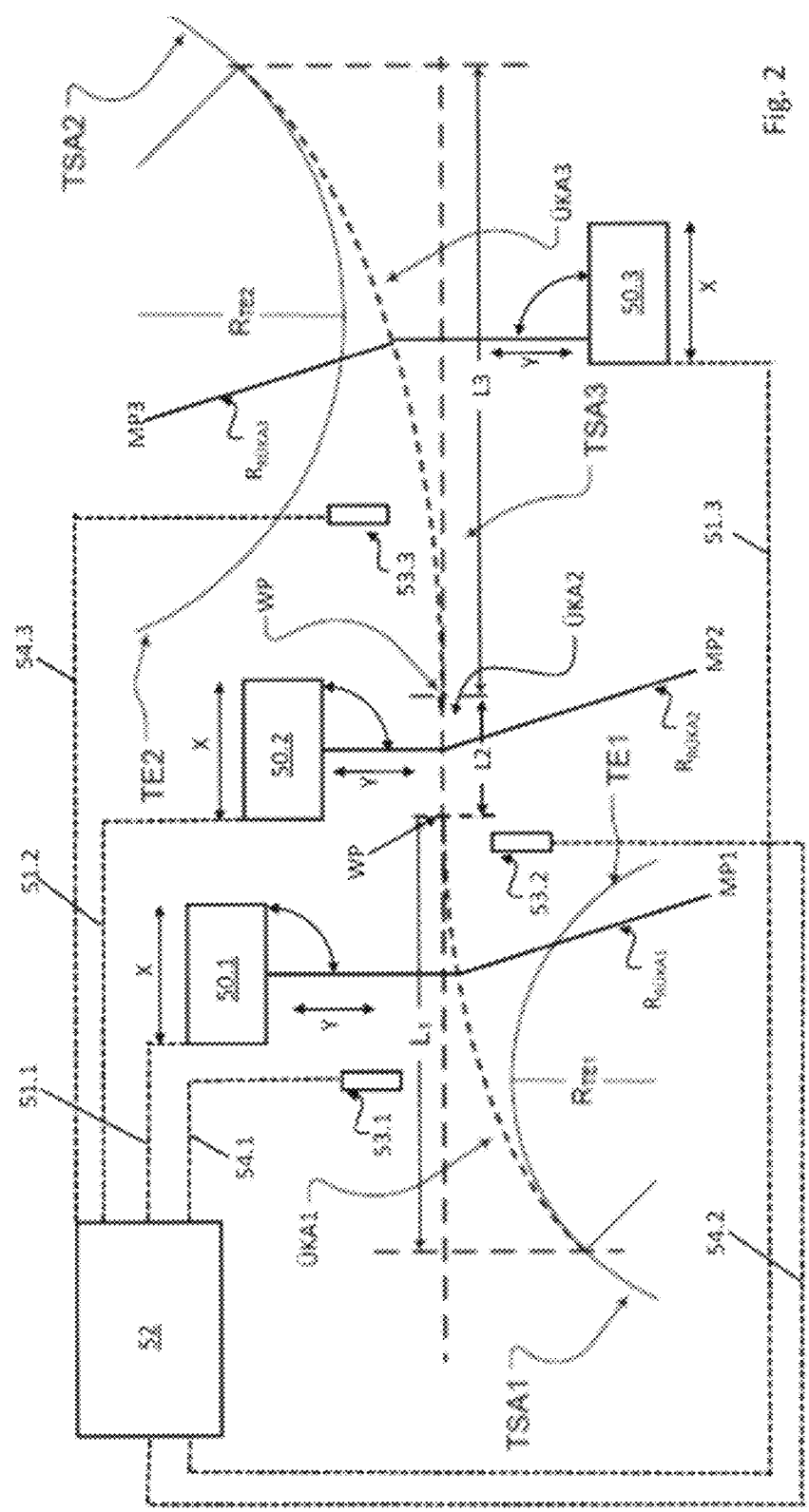
FIG. 2 shows a transfer region between two transporters.

FIG. 2 shows that section of the transport path TS in FIG. 1 that is enclosed by a dashed oval. The transport path TS comprises first and second transport-path sections TSA1, TSA2 that follow a circular arc. The first and second transport-path portions TSA1, TSA2 have an essentially constant curvature but with opposite signs. The radii-of-curvature for the first and second transport-path portions TSA1, TSA2 correspond to the first and second radii RTE1, RTE2 of the first and second transporters TE1, TE2, respectively. These radii-of-curvature are therefore not adjustable.

A third transport-path section TSA3 is disposed between the first and second transport-path sections TSA1, TSA2. Along this third transport-path section TSA3, a container 2 carried by the first transporter TE1 becomes a container 2 carried by the second transporter TE2. This third transport-path section TSA3 comprises a transition curve having first, second, and third transition-curve sections ÜKA1, ÜKA2, ÜKA3.

To reduce transverse jerk, the third transport-path section TSA3 comprises at least one transition-curve section ÜKA1, ÜKA2, ÜKA3 having an adjustable curvature. An electronic controller 52 controls one or more adjusters 50.1, 50.2, 50.3 so as to regulate the curvature along one or more of the transition-curve sections ÜKA1, ÜKA2, ÜKA3. In some cases, this is carried out by adjustment a length $L_1$, $L_2$, $L_2$ of a transition-curve sections ÜKA1, ÜKA2, ÜKA3. In other cases, this is carried out by adjusting a radius $R_{ÜKA1}$, $R_{ÜKA2}$, $R_{ÜKA3}$ of a transition-curve sections ÜKA1, ÜKA2, ÜKA3. And in still other cases, this is carried out by adjustment of a mid-point $MP_1$, $MP_2$, $MP_3$ of a transition-curve section ÜKA1, ÜKA2, ÜKA3.

The ability to dynamically adjust a transition-curve section ÜKA1, ÜKA2, ÜKA3 promotes flexibility in adjusting the transport system 1 to accommodate products with different mechanical properties, examples of which include toughness, adhesion behavior, and internal damping within the fluid. This ability also reduces the risk of spillage due to transverse jerk when operating the transport system 1 at different processing rates, such as with varying numbers of containers per unit time being processed.

Referring now to FIG. 6, containers 2 that traverse the third transport-path section TSA3 travel along a channel 5 defined by inner and outer guide rails 4. The channel's path determines the curvature of the transition-curve section ÜKA1, ÜKA2, ÜKA3. It is this curvature that is adjusted by the adjuster 50.1, 50.2, 50.3.

In some embodiments, the adjuster 50.1, 50.2, 50.3 comprises an eccentric device that moves the guide rails 4 relative to one another. Other embodiments include those in which the adjuster 50.1, 50.2, 50.3 is a jointed device or a linear actuator. In either case, the adjuster's movement provides a way to adjust some combination of length $L_1$, $L_2$, $L_2$, radius $R_{ÜKA1}$, $R_{ÜKA2}$, $R_{ÜKA3}$, and mid-point $MP_1$, $MP_2$, $MP_3$ of the associated radius $R_{ÜKA1}$, $R_{ÜKA2}$, $R_{ÜKA3}$.

It is particularly useful to have several adjusters 50.1, 50.2, 50.3 be assigned to one or more transition-curve sections ÜKA1, ÜKA2, ÜKA3 of the third transport-path section TSA3 and to space these adjusters 50.1, 50.2, 50.3 at a distance from one another along the transport-path section TSA3.

To provide feedback to the controller 52, it is particularly useful to include corresponding sensors 53.1, 53.2, 53.3 at fixed locations in the region of the third transport-path section TSA3. Examples of suitable sensors 53.1, 53.2, 53.3 include an optical sensor, such as a video camera that connects to the controller 52 via a corresponding signal line 54.1, 54.2, 54.3.

As a container 2 travels along a curved path, centrifugal force acts on the liquid. As a result, the level of liquid in the container 2 changes from that which exists when the container 2 is at rest. If the change is too great, a risk of spillage arises. To reduce such risk, the controller 52 causes adjustment of the path along which the container 2 travels so that a measured "actual spillage height," remains less than a "reference spillage height" that is stored at the controller 52.

A sensor 53.1, 53.2, 53.3 observes actual spillage heights in containers that travel through a detection region along the third transport-path section TSA3. The sensor 53.1, 53.2, 53.3 then provides a signal indicative of the actual spillage height to the controller 52. In some embodiments, the sensor 53.1, 53.2, 53.3 simultaneously observes actual spillage heights of several containers 2 that are traversing a detection region at a fixed location.

The sensor 53.1, 53.2, 53.3 provides a signal indicative of actual spillage height of a container 2 to the controller 52, which then compares it with a stored reference spillage height. The controller 52 then sends a signal via a control line 51.1, 51.2, 51.3 to an adjuster 50.1, 50.2, 50.3 so as to cause an adjustment that controls a difference between the actual spillage height IH and the reference spillage height.

In other embodiments, the controller 52 controls the transport system's production capacity based on the signals provided by the sensors 53.1, 53.2, 53.3. This production capacity is related to the number of containers transported per unit time. In such embodiments, production capacity thus depends on spillage height.

It is particularly advantageous to be able to monitor the actual spillage height at all the regions along the transport path TS at which a significant risk of spillage exists. For this purpose, it is useful to provide several sensors 53.1, 53.2, 53.3 to detect the actual spillage height. By monitoring all such locations, it becomes possible to run the transport system 1 as closes as possible to its maximum production capacity.

Some practices of operating the transport system 1 include starting the transport system 1 with a transport capacity that is lower than its maximum capacity. A sensor 53.1, 53.2, 53.3 then detects actual spillage height in one or more containers 2. The controller 52 then increases the transport capacity so that it approaches the actual spillage height moves towards the reference spillage height. After doing so, the controller 52 adjusts one or more transition-curve sections ÜKA1, ÜKA2, ÜKA3. The controller 52 iterates these steps, increasing the transport capacity by a small amount each time, until the transport system 1 is operating at or close to the transport system's maximum transport capacity.

Other practices of operating the transport system 1 include starting the transport system 1 with an operating transport capacity that is lower than its maximum capacity. A sensor 53.1, 53.2, 53.3 then detects actual spillage height in one or more containers 2. The controller 52 then adjusts one or more transition-curve sections ÜKA1, ÜKA2, ÜKA3. After having done so, the controller 52 raises the operating transport capacity. The controller 52 iterates these steps, increasing the transport capacity by a small amount each time, until the transport system 1 is operating at or close to the transport system's maximum transport capacity.

In some embodiments, the third transport-path section TSA3 comprises a first and second transition-curve sections ÜKA1, ÜKA2 that are adjustable separately and independently of one another. In such embodiments, a first adjuster 50.1 adjusts the first transition-curve section ÜKA1 and a second adjuster 50.2 adjusts the second transition-curve section ÜKA2.

In other embodiments, the third transport-path section TSA3 comprises first, second, and third transition-curve sections ÜKA1, ÜKA2, ÜKA3 that are adjustable separately and independently of one another. In such embodiments, a first adjuster 50.1 adjusts the first transition-curve section ÜKA1, a second adjuster 50.2 adjusts the second transition-curve section ÜKA2, and a third adjuster 50.3 adjusts the third transition-curve section ÜKA3.

In some embodiments, the first, second, and third transition-curve sections ÜKA1, ÜKA2, ÜKA3 are adjusted to have mutually different lengths L1, L2, L3, radii $R_{ÜKA1}$, $R_{ÜKA2}$, $R_{ÜKA3}$, and/or midpoints MP1, MP2, MP3.

In other embodiments, at least one transition-curve section ÜKA1, ÜKA2, ÜKA3 of the third transport-path section TSA3 comprises a portion shaped like a clothoid or shaped like a Bloss curve.

Figure 3:
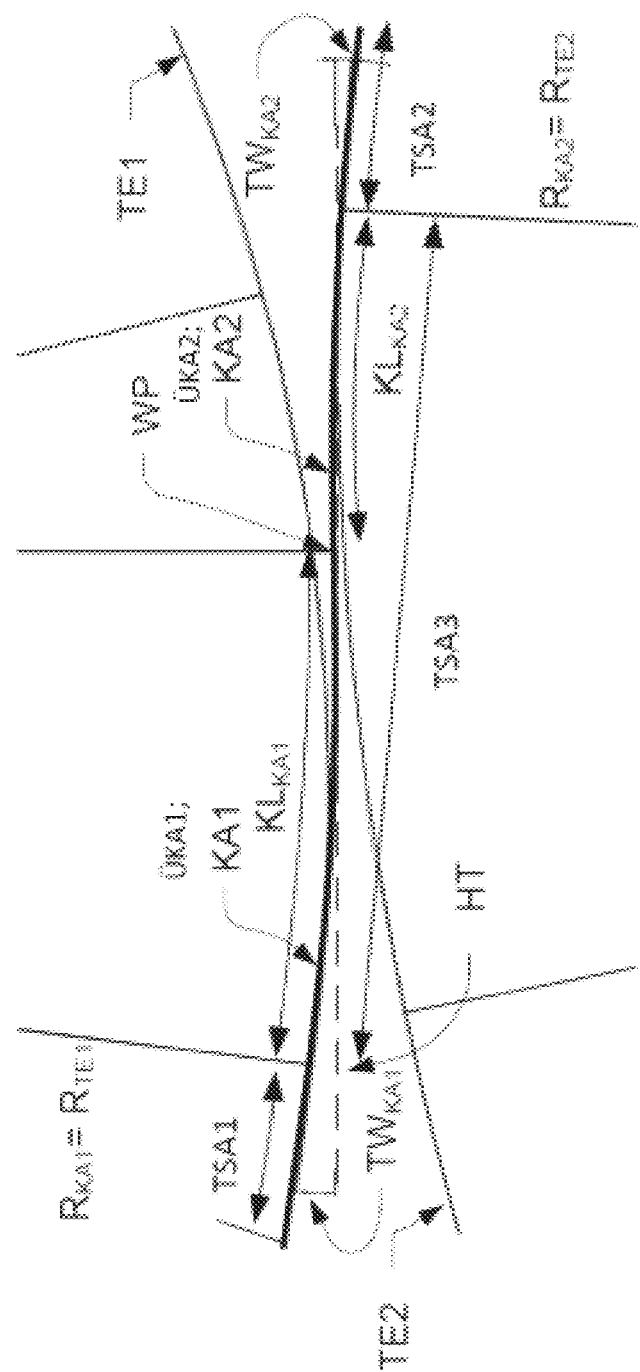
FIG. 3 shows transition curves in the transfer region of FIG. 2.

In the embodiments shown in FIG. 3, the first transition-curve section ÜKA1 comprises a first clothoid KA1 and the second transition-curve section ÜKA2 comprises a second clothoid KA2. As a result, a container 2 that follows the first and second clothoids KA1, KA2 executes a transfer from the first and second transporters TE1, TE2 with reduced jerk.

In the exemplary embodiment shown in FIG. 3, the first clothoid KA1 connects the first transport-path section TSA1 to a turning point WP and the second clothoid KA2 connects the turning point WP to the second transport-path section TSA2. The first and second clothoids have lengths $KL_{KA1}$ and $KL_{KA2}$ respectively.

Figure 4:
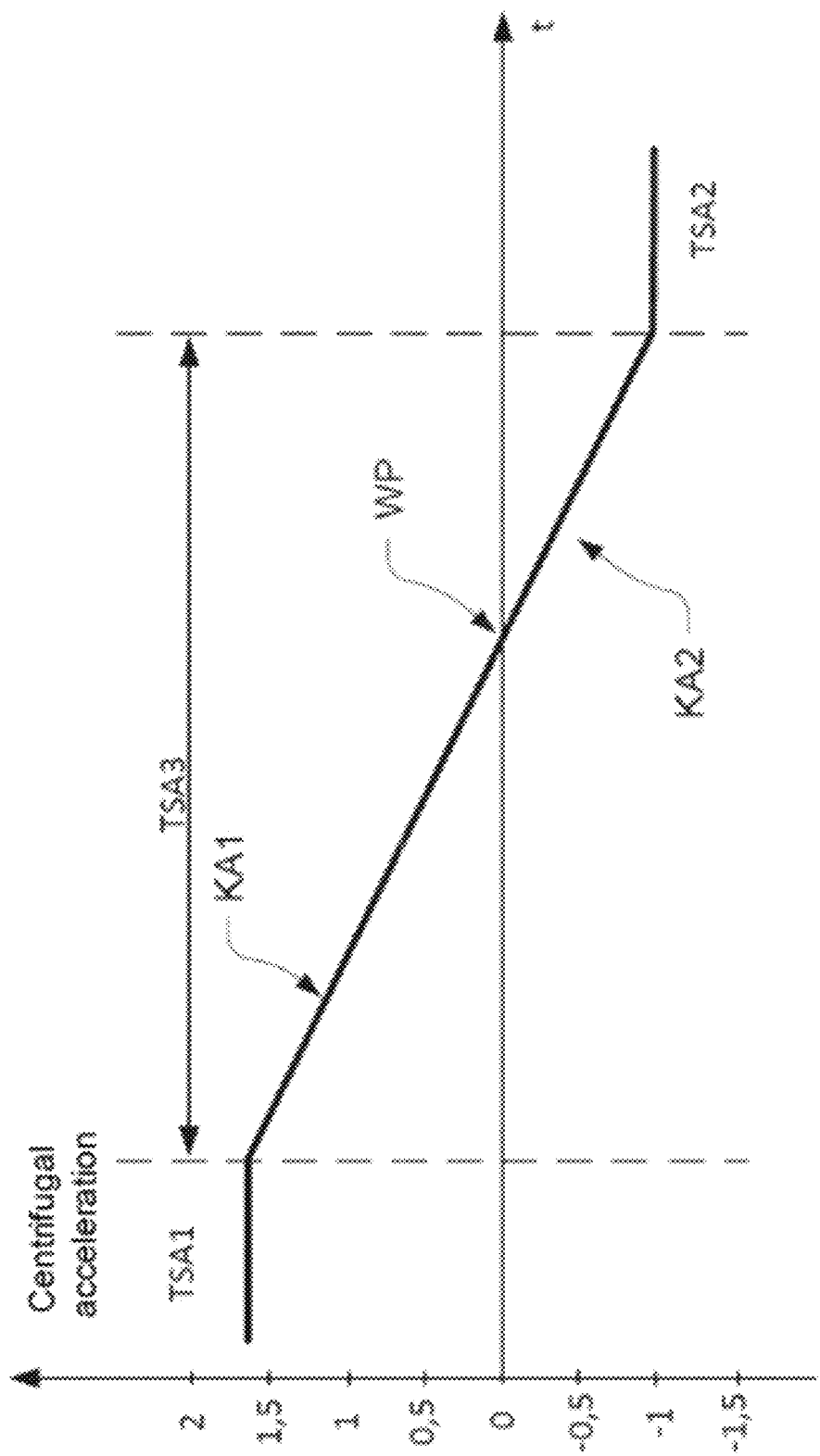
FIG. 4 shows acceleration experienced by a container as it traverses a transition curve of the type shown in FIG. 2.

FIG. 4 shows centrifugal acceleration experienced by a container 2 as it transitions between the first and second transport-path sections TSA1, TSA2. As shown therein, the container 2 experiences constant centrifugal acceleration while on the first and second transport-sections TSA1, TSA2. The sign change indicates an inflection point between the first and second transport-sections TSA1, TSA2.

A container 2 that traverses the first and second clothoids KA1, KA2 experiences a constant deceleration until it reaches the turning point WP, at which point it begins to increase a constant acceleration, though with a different sign. The linear character of the rate of change of deceleration results in a reduced jerk. At the turning point WP, both the first and second clothoids KA1, KA2 have an infinite clothoid radius. Thus, the first and second clothoids KA1, KA2, transition into one another free of any curvature at the turning point WP. The curvature of each of the first and second clothoids KA1, KA2 changes smoothly as one moves away from the turning point in either direction until it eventually matches the radius-of-curvatures of the first and second transport-path sections TSA1, TSA2.

An alternative to the path shown in FIG. 3 is one in which the third transport-path section TSA3 comprises only one single clothoid portion. Some embodiments replace the first clothoid KA1 shown in FIG. 2 by a straight transport-path section.

An alternative to the path shown in FIG. 2 is one in which the third transport-path section TSA3 between the first and second clothoids KA1, KA2 comprises a transport-path section that is straight. The form of the third transport-path section TSA3 therefore depends on geometry of other components, an example of which is the diameter of the first and second transporters TE1, TE2.

A clothoid is a curve in which the curvature changes in linear fashion with the bend length, also designated as the clothoid length. Accordingly, the following applies:

$$KL \cdot R = \text{const.} \quad \text{(Equation 1)}$$

where KL is the clothoid length and R is the curvature radius at the end of the clothoid portion, also designated as the clothoid radius. This constant is frequently expressed by a clothoid parameter "A", such that the following applies:

$$KL \cdot R = A^2 \quad \text{(Equation 2)}$$

A further characteristic of a clothoid is the tangent angle TW between the main tangent HT at the beginning of the clothoid (i.e., at the turning point WP) and the tangent at any desired curve point of the clothoid. The tangent angle TW can be described as follows:

$$TW[\text{rad}] = \frac{KL}{2R} = \frac{A^3}{2R^2} \quad \text{(Equation 3)}$$

By solving for "A" in Equation 3, the clothoid parameter "A" can be calculated as follows:

$$A = \sqrt{TW \cdot 2 \cdot R^2} \quad \text{(Equation 4)}$$

When dimensioning the parameters for the first and second clothoids KA1, KA2, it is useful to select the clothoid radius R at the end of the clothoid portion, i.e., at the transition point to the transport-path section TSA1, TSA2 to be:

$$R = \frac{TK}{2} \quad \text{(Equation 5)}$$

wherein TK is the diameter of the transporter TE1, TE2, from which the clothoid portion departs and, respectively, to which the clothoid portion connects. Accordingly, the clothoid radius R of the clothoid portion preferably amounts to half of the diameter TK of the transporter TE1, and the clothoid radius R of the clothoid portion KA2 preferably amounts to half of the diameter TK of the transporter TE2. Doing so was unexpectedly critical to reducing transverse jerk at the transition point between transport-path sections TSA1, TSA2.

The tangent angle TWKA1, TWKA2 of the tangents at the transition of the respective first or second clothoid KA1, KA2 to the partial circle-shaped transport-path section TSA1, TSA2 advantageously lies in ranges between 0.06 radians and 0.5 radians, and preferably between 0.1 radians and 0.4 radians. For particular preference, a value of the tangent angle TW is 0.2 radians. These ranges of angle were unexpectedly found to be critical ranges because, when such angles are used, the axis distance intervals of the transporters and/or the gripper lift stroke, which is completed in the region of the third transport-path section TSA3, in practice move within readily attainable ranges.

The clothoid parameter "A" is preferably chosen in the range between 125 millimeters and 250 millimeters, preferably in the range between 150 millimeters and 200 millimeters, and for particular preference in the range between 170 millimeters and 180 millimeters, in particular 177 millimeters. The clothoid length KL preferably lies in the range between 50 millimeters and 250 millimeters, and for particular preference between 100 millimeters and 200 millimeters.

As a result of having parameterized the clothoid, a transfer of the container between the transporters is achieved which is as far as possible free of any jerk effect.

In some embodiments, the second transporter TE2 is a transport star having a container gripper that is radially displaceable relative to a machine axis MA about which the second transporter TE2 is rotated. A control curve controls radial displacement of the container gripper during rotation of the second transporter TE2. In a preferred embodiment, the control curve is fixed and a roller on the container gripper interacts with the control curve to cause radial motion of the container gripper such that the container moves along the path shown along the third transport-path section TSA3 in FIG. 2.

Preferably, for taking over the container in the transition region between the transport-path sections TSA1 and TSA3 the container gripper is positioned displaced radially outwards, and then, at the movement through the third transport-path section TSA3, is drawn back radially in the direction of the machine axis MA of the second transporter TE2, such that the container follows the desired transport path course, comprising at least one transition-curve section. For the transfer of the container to the third transporter TE3, conversely the container gripper is moved radially outwards, such the container is transferred to the third transporter TE3 in a transport path course which is in a clothoid form.

After the handover to the third transporter TE3, the container gripper can remain in its radially outwards position or the position can be slightly adjusted until the respective container gripper again takes up a container from the first transporter TE1. As an alternative, it is possible, after the transfer of the container to the third transporter TE3, for the container gripper to be drawn back radially inwards, and only moved radially outwards again shortly before a new container is taken up again from the first transporter TE1.

In the embodiments presented heretofore, a type of transfer bend in the form of a clothoid or clothoid curve has been described. As an alternative and by analogous application, it is also possible to use another transfer bend, with a change of curvature free of any sharp changes of direction and constantly increasing or decreasing. An example is a Bloss curve. As used herein, a portion of a Bloss curve is a Bloss curve. In some embodiments, Bloss curves and clothoids are both used in combination.

Figure 5:
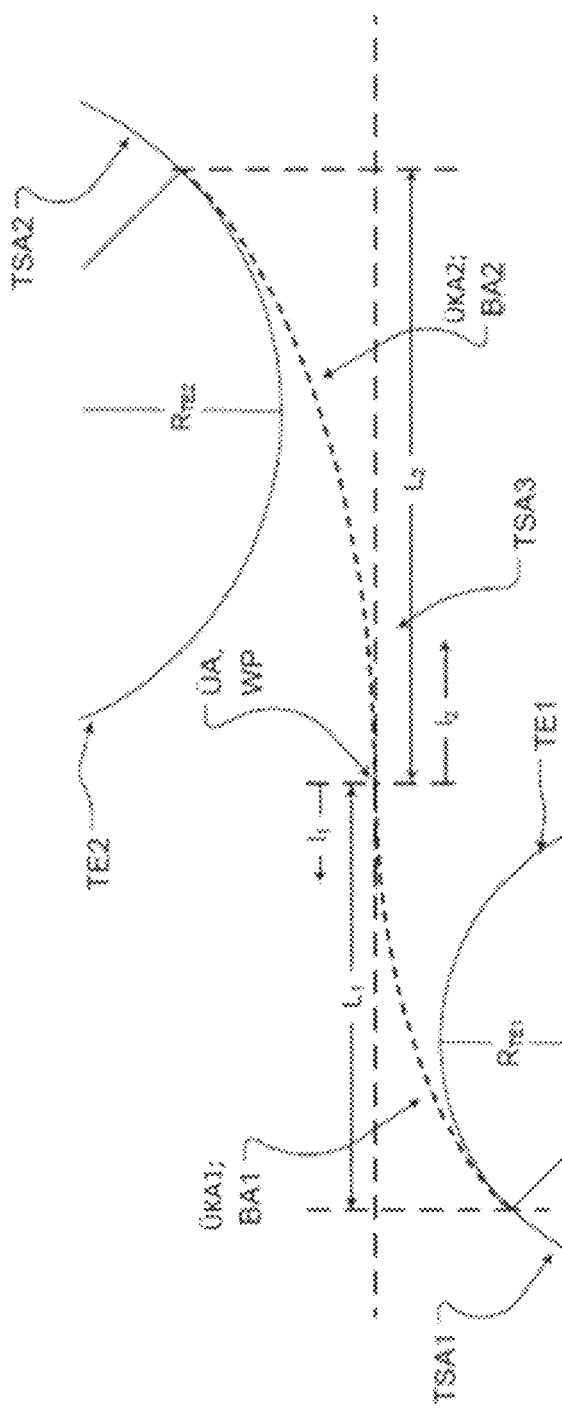
FIG. 5 shows is similar to FIG. 3 but with the transition curves including portions of two Bloss curves.

FIG. 5 shows, by analogy with FIG. 3, a portion of the transport path TS from FIG. 1 in the region of the oval designated by the broken line, i.e., a portion of the transport path TS in the transition region between the first and second transporters TE1, TE2, with a transition-curve section ÜKA1, ÜKA2 of the third transport-path section TSA3 being configured as a clothoid and/or Bloss curve BA1, BA2, by means of which a transfer of the containers is carried out which is free or essentially free of transverse jerk effects. In this situation, a container being conveyed from the first transporter TE1 to the second transporter TE2 runs through the third transport-path section TSA3, which in the exemplary embodiment shown comprises a first Bloss-curve portion BA1 and a second Bloss-curve portion BA2.

The curvature k of the Bloss-curve portions BA1, BA2 can be described by the following formula:

$$k = \frac{3}{R \cdot L^2} \cdot l^2 - \frac{2}{R \cdot L^3} \cdot l^3$$

wherein R is a radius of a connection partial circle, i.e., the radius RTE1, RTE2 of the respective transporter TE1, TE2, to which the Bloss curve portion then forms a transition. The length l forms an intermediate length of a transition-curve section, seen from a transition curve beginning ÜA (also designated as the turning point WP of the third transport-path section TSA3, in the exemplary embodiment shown, the intermediate lengths l1, l2 of the respective Bloss curve portions BA1, BA2), and L forms the total length of the transition curve or of the Bloss curve portion (in the exemplary embodiment shown, the lengths L1, L2 of the respective Bloss curve portions BA1, BA2).

The invention has been described heretofore on the basis of exemplary embodiments. It is understood that a large number of modifications or derivations are possible without thereby departing from the scope of protection of the invention as defined by the claims.

The invention claimed is:

1. An apparatus comprising a transport system for transporting containers along a transport path in a transport direction, said transport system comprising first and second transporters that define first and second transport-path sections, a controller, an adjuster, and a sensor, wherein at least one of said first and second transport-path sections follows an arc of a circle, wherein said transport system further comprises a third transport-path section that is between said first and second transport-path sections, and wherein said third transport-path section comprises an adjustable transition curve that is defined by inner and outer guiderails that define a channel therebetween along which said containers travel while being guided by said guiderails, said apparatus further comprising an adjuster that adjusts said guide rails, thereby adjusting said adjustable transition curve, wherein said sensor is configured to detect an actual spillage height of a container as said container traverses a detection region along said transport path and to provide said actual spillage height to said controller, wherein said controller is configured to compare said actual spillage height with a reference spillage height stored therein and to cause said adjuster to adjust said adjustable transition curve by adjusting at least one of a length, a radius, and a midpoint thereof to thereby control said actual spillage height.

2. The apparatus of claim 1, further comprising an adjuster that adjusts a curvature of said adjustable transition curve.

3. The apparatus of claim 1, further comprising one or more adjusters that adjust a length, radius, and midpoint of said adjustable transition curve.

4. The apparatus of claim 1, further comprising plural adjustment devices that are spaced apart along said adjustable transition curve.

5. The apparatus of claim 1, wherein said controller is configured to adjust a production capacity of said transport system to control said actual spillage height.

6. The apparatus of claim 1, wherein said adjustable transition curve comprises transition curve sections that are independently adjustable from each other.

7. The apparatus of claim 1, wherein said adjustable transition curve comprises a first transition curve section and a second transition curve section, said first and second transition curve sections being independently adjustable, wherein said apparatus further comprises a first adjuster that adjusts said first transition curve section and a second adjuster that adjusts said second transition curve section, wherein said first adjuster is configured to adjust at least one of a radius-of-curvature of said first transition curve section, a length of said first transition curve section, and a midpoint of said first transition curve section, and wherein said second adjuster is configured to adjust at least one of a radius-of-curvature of said second transition curve section, a length of said second transition curve section, and a midpoint of said second transition curve section.

8. The apparatus of claim 1, wherein said adjustable transition curve comprises first, second, and third transition curve sections that are independently adjustable.

9. The apparatus of claim 1, wherein said adjustable transition curve comprises first, second, and third transition curve sections that are independently adjustable, wherein said third transition curve section comprises a length, radius, and midpoint, and wherein said apparatus further comprises an adjuster that adjusts at least one of said length, radius, and midpoint of said third transition curve section.

10. The apparatus of claim 1, wherein said adjustable transition curve is configured as a portion of a curve selected from the group consisting of a clothoid and a Bloss curve portion.

11. The apparatus of claim 1, wherein said adjustable transition curve is described by $$A = \sqrt{2 \cdot TW \cdot R^2};$$

$$KL = \frac{A^2}{R};$$

wherein A is a clothoid parameter, TW is a tangent angle, R is a clothoid radius, and KL is a clothoid length.

12. The apparatus of claim 1, wherein said adjustable transition curve is a clothoid having a clothoid parameter that is no more than ten millimeters greater than 170 millimeters.

13. An apparatus comprising a transport system for transporting containers along a transport path in a transport direction, said transport system comprising first and second transporters that define first and second transport-path sections, wherein at least one of said first and second transport-path sections follows an arc of a circle, wherein said transport system further comprises a third transport-path section that is between said first and second transport-path sections, wherein said third transport-path section comprises an adjustable transition curve, and wherein said adjustable transition curve is a clothoid having a tangent angle that is between 0.1 radians and 0.4 radians.

14. The apparatus of claim 1, wherein said adjustable transition curve is a Bloss curve defined by $$k = \frac{3}{R \cdot L^2} \cdot l^2 - \frac{2}{R \cdot L^3} \cdot l^3$$

wherein k is the curvature, R is a radius of a connection arc, l is an intermediate length of a transition curve portion seen from said transition curve's beginning, and L is said transition curve's total length.

15. An apparatus comprising a transport system for transporting containers along a transport path in a transport direction, said transport system comprising first and second transporters that define first and second transport-path sections, wherein at least one of said first and second transport-path sections follows an arc of a circle, wherein said transport system further comprises a third transport-path section that is between said first and second transport-path sections, wherein said third transport-path section comprises an adjustable transition curve, and wherein said adjustable transition curve comprises a clothoid and wherein a length of either said clothoid or said transition curve is between one hundred millimeters and two hundred millimeters.

16. A method comprising using a transport device to transport containers along a transport path using first and second transporters, said transport path comprising first and second transport-path sections, wherein at least one of said first and second transport-path sections follows an arc of a circle, wherein transporting said containers comprises causing said containers to traverse a third transport-path section that comprises inner and outer guiderails that define a channel therebetween along which said containers travel while being guided by said guiderails, and that is between said first and second transport-path sections, and detecting an actual spillage height of a container as said container traverses a detection region along said transport path, comparing said actual spillage height with a stored reference spillage height, adjusting said guide rails, thereby adjusting a transition curve along said third transport-path section, wherein adjusting said adjustable transition curve comprises adjusting at least one of a length, a radius, and a midpoint thereof to thereby control said actual spillage height.

17. The method of claim 16, further comprising observing an actual spillage height of a container, comparing said actual spillage height to a reference spillage height, and changing a capacity of said transport device to regulate a difference between said actual spillage height and said reference spillage height.

18. The method of claim 16, wherein using said transport device comprises observing an actual spillage height of a container traversing said transport path, raising a transport capacity of said transport device until said actual spillage height corresponds to a reference filling height and, after having done so, adjusting said transition curve's curvature.

19. The method of claim 16, wherein using said transport device comprises operating said transport device at a transport capacity, observing an actual spillage height of a container traversing said transport path, adjusting said transition curve's curvature, and, after having done so, raising said transport capacity until said actual spillage height corresponds to a reference spillage height.

20. The apparatus of claim 1, wherein said first and second transport path sections both follow arcs of circles.

* * * * *